United States Patent
Legare et al.

(10) Patent No.: US 8,092,146 B2
(45) Date of Patent: Jan. 10, 2012

(54) ACTIVE TIP CLEARANCE CONTROL ARRANGEMENT FOR GAS TURBINE ENGINE

(75) Inventors: Pierre-Yves Legare, Chambly (CA); Stephen Mah, Brossard (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 720 days.

(21) Appl. No.: 12/411,495

(22) Filed: Mar. 26, 2009

(65) Prior Publication Data

US 2010/0247297 A1    Sep. 30, 2010

(51) Int. Cl.
*F01D 11/24* (2006.01)

(52) U.S. Cl. ............ 415/1; 415/108; 415/116; 415/145; 415/176

(58) Field of Classification Search .................. 415/101, 415/108, 144, 145
See application file for complete search history.

(56) References Cited

U.S. PATENT DOCUMENTS

| | | | |
|---|---|---|---|
| 4,329,114 A | 5/1982 | Johnston et al. | |
| 4,493,184 A | 1/1985 | Nikkanen et al. | |
| 4,683,716 A | 8/1987 | Wright et al. | |
| 5,048,288 A | 9/1991 | Bessette et al. | |
| 5,064,343 A * | 11/1991 | Mills | 415/173.3 |
| 5,116,199 A | 5/1992 | Ciokajlo | |
| 5,188,506 A | 2/1993 | Creevy et al. | |
| 5,273,396 A | 12/1993 | Albrecht et al. | |
| 5,330,321 A * | 7/1994 | Roberts et al. | 415/136 |
| 5,351,473 A * | 10/1994 | Shuba | 60/782 |
| 5,351,732 A * | 10/1994 | Mills et al. | 415/175 |
| 5,964,575 A | 10/1999 | Marey | |
| 6,139,257 A | 10/2000 | Proctor et al. | |
| 6,246,138 B1 | 6/2001 | Nims | |
| 6,997,673 B2 | 2/2006 | Morris et al. | |
| 7,108,479 B2 | 9/2006 | Beverley et al. | |
| 2002/0005038 A1* | 1/2002 | Boeck | 60/204 |
| 2006/0225430 A1 | 10/2006 | Paprotna et al. | |
| 2007/0086887 A1 | 4/2007 | Pezzetti, Jr. et al. | |
| 2008/0112798 A1* | 5/2008 | Seitzer et al. | 415/144 |

* cited by examiner

*Primary Examiner* — Stephen W Smoot

(74) *Attorney, Agent, or Firm* — Norton Rose Or LLP

(57) ABSTRACT

An active tip clearance control (ATCC) apparatus of an aircraft gas turbine engine is situated within a pressurized core case of the engine. First and second portions of bypass air flow passing through the respective compressed core compartment and the ATCC apparatus, are isolated from one another in order to improve both the ATCC performance and bypass air duct performance.

17 Claims, 3 Drawing Sheets

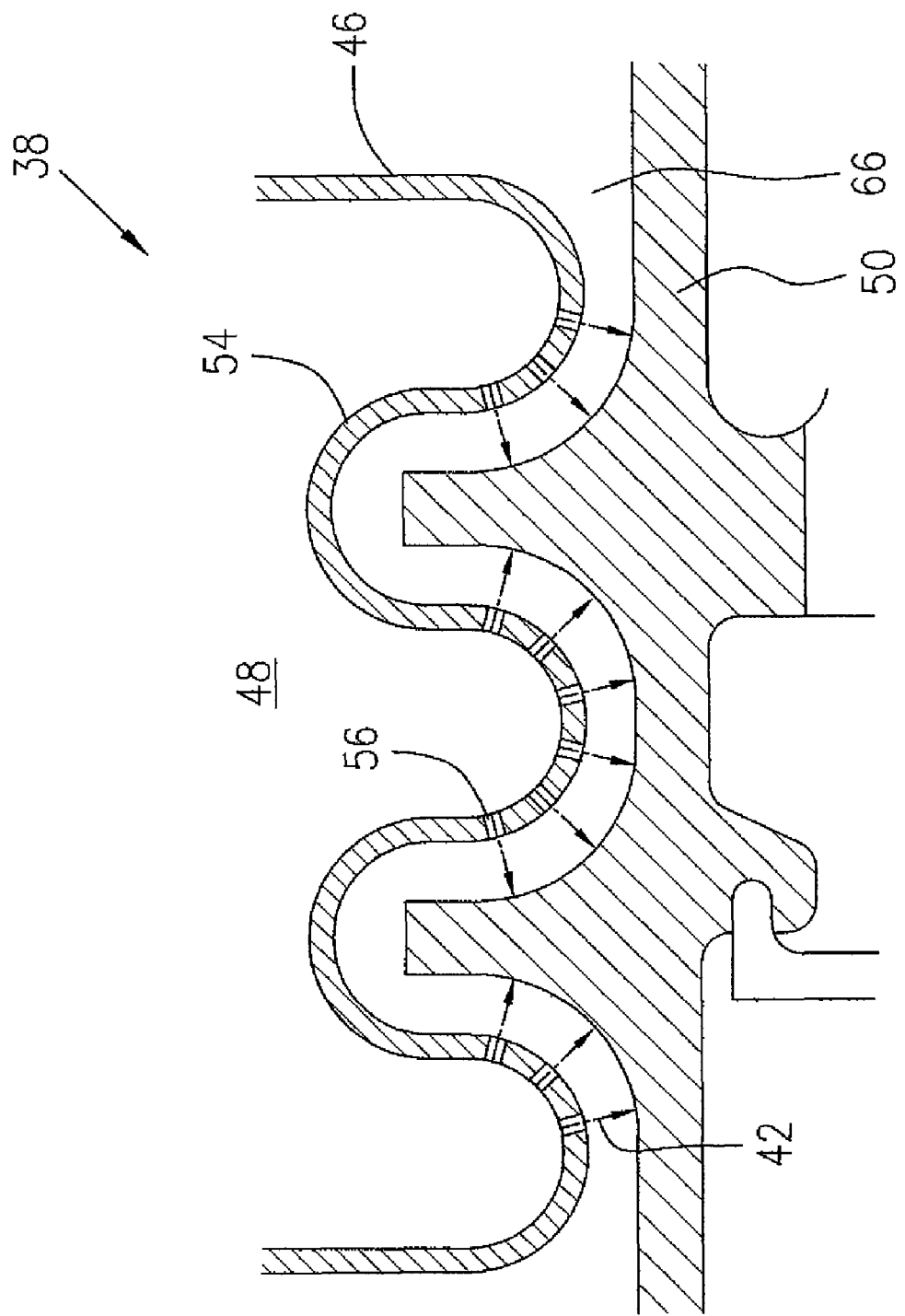

ACTIVE TIP CLEARANCE CONTROL ARRANGEMENT FOR GAS TURBINE ENGINE

TECHNICAL FIELD

This disclosure relates generally to a turbofan gas turbine engine and more particularly, to an active tip clearance control (ATCC) system of a turbofan gas turbine engine.

BACKGROUND OF THE ART

A pressurized core cowl refers to a sealed core compartment of a core case of a turbofan gas turbine engine, to use a portion of a bypass air to cool engine components located within the core compartment. In a pressurized core cowl the pressure differential (ΔP) available to bypass air an active tip clearance control (ATCC) apparatus is limited. In low ΔP situations, a scoop is often used in a bypass air duct to create a dynamic pressure head, in order to create the required pressure differential in the pressurized core cowl to drive the ATCC apparatus. However, the resulting driving pressure may be marginal and the scoop may impact bypass duct performance. A scoop-less system may be possible if the core compartment is vented with respect to atmospheric pressure, but this may degrade engine performance because the portion of bypass air introduced into the core compartment is no longer returned to the engine for thrust recovery.

Therefore, there is a need to provide an improved ATCC apparatus.

SUMMARY

In one aspect there is an aircraft turbofan gas turbine engine which comprises an annular outer case surrounding a fan assembly; an annular core case positioned within the annular outer case and accommodating a compressor assembly, a combustion gas generator assembly and a turbine assembly, the annular outer and core cases defining an annular bypass air duct therebetween for directing a bypass air flow driven by the fan assembly to pass therethrough; a core compartment configured within the annular core case, the core compartment having an inlet defined in the annular core case for introducing a first portion of the bypass air flow into the core compartment to cool a number of engine components located within the core compartment and having an outlet defined in the annular core case downstream of the inlet, the core compartment being sealed to allow the first portion of the bypass air flow to be discharged only through the outlet and back to the annular bypass air duct; and an active tip clearance control (ATCC) apparatus located within the sealed core compartment, the ATCC apparatus having an inlet defined in the annular core case for introducing a second portion of the bypass air flow into the ATCC apparatus and having a vent passage in fluid communication with atmosphere, the ATCC apparatus being sealed to prevent the second portion of the bypass air flow from mixing with the first portion of the bypass air flow.

In another aspect there provided a method for use of bypass air of a turbofan gas turbine engine to cool the engine while reducing bypass air thrust losses, the method comprising steps of a) directing a first portion of bypass air from a bypass air duct of the engine into a core compartment of a core case of the engine to cool a number of engine components within the core compartment in a manner to substantially maintain an air pressure of the first portion of bypass air and then injecting the first portion of bypass air back into a main bypass air flow passing through the bypass air duct; b) directing a second portion of bypass air from the bypass air duct to pass through an active tip clearance control (ATCC) apparatus within the core compartment to cool a turbine case and then venting the second portion of bypass air to atmosphere; and c) isolating the second portion of bypass air from the first portion of bypass air to prevent mixing one with another.

Further details of these and other aspects of above concept will be apparent from the detailed description and drawings included below.

DESCRIPTION OF THE DRAWINGS

Reference is now made to the accompanying drawings, in which:

FIG. 3 is a partial cross-sectional view of the ATCC apparatus of FIG. 2 in an enlarged scale, showing the occurrence of impingement cooling under a pressure differential.

DETAILED DESCRIPTION OF THE PREFERRED EMBODIMENTS

Figure 1:
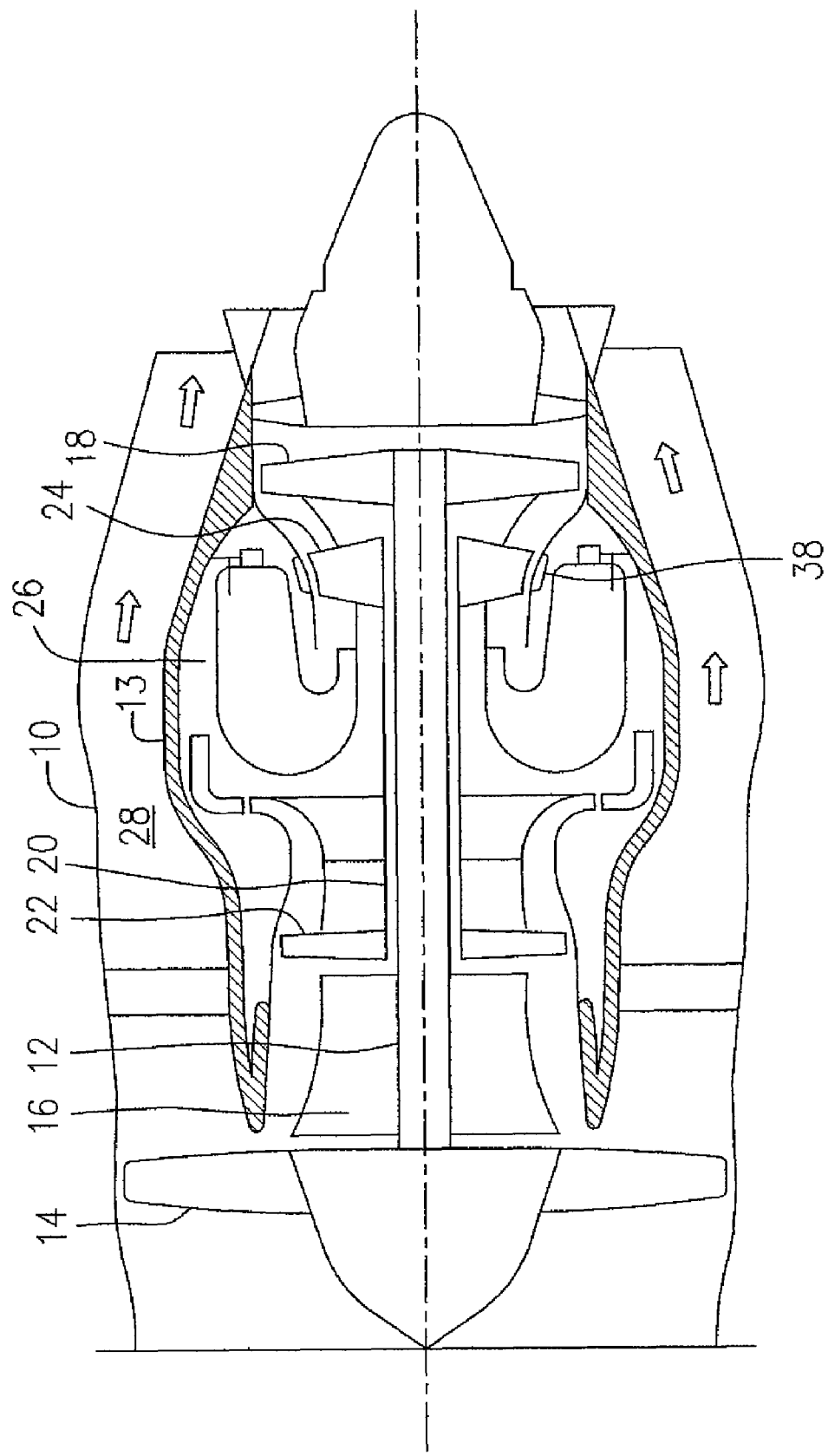
FIG. 1 is a schematic cross-sectional view of a turbofan gas turbine engine having an active tip clearance control apparatus.

FIG. 1 illustrates a turbofan gas turbine aircraft engine presented as an example of the application of the described concept, including a housing or nacelle annular outer case 10, a annular core case 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The annular core case 13 surrounds the low and high pressure spool assemblies 12 and 20 in order to define a main fluid path (not numbered) therethrough. In the main fluid path there is provided a combustor to constitute a gas generator section 26. An annular bypass air duct 28 is defined radially between the annular outer case 10 and the annular core case 13 for directing a main bypass air flow (not numbered) driven by the fan assembly 14, to pass therethrough and to be discharged to create a bypass air thrust to the aircraft engine.

Figure 2:
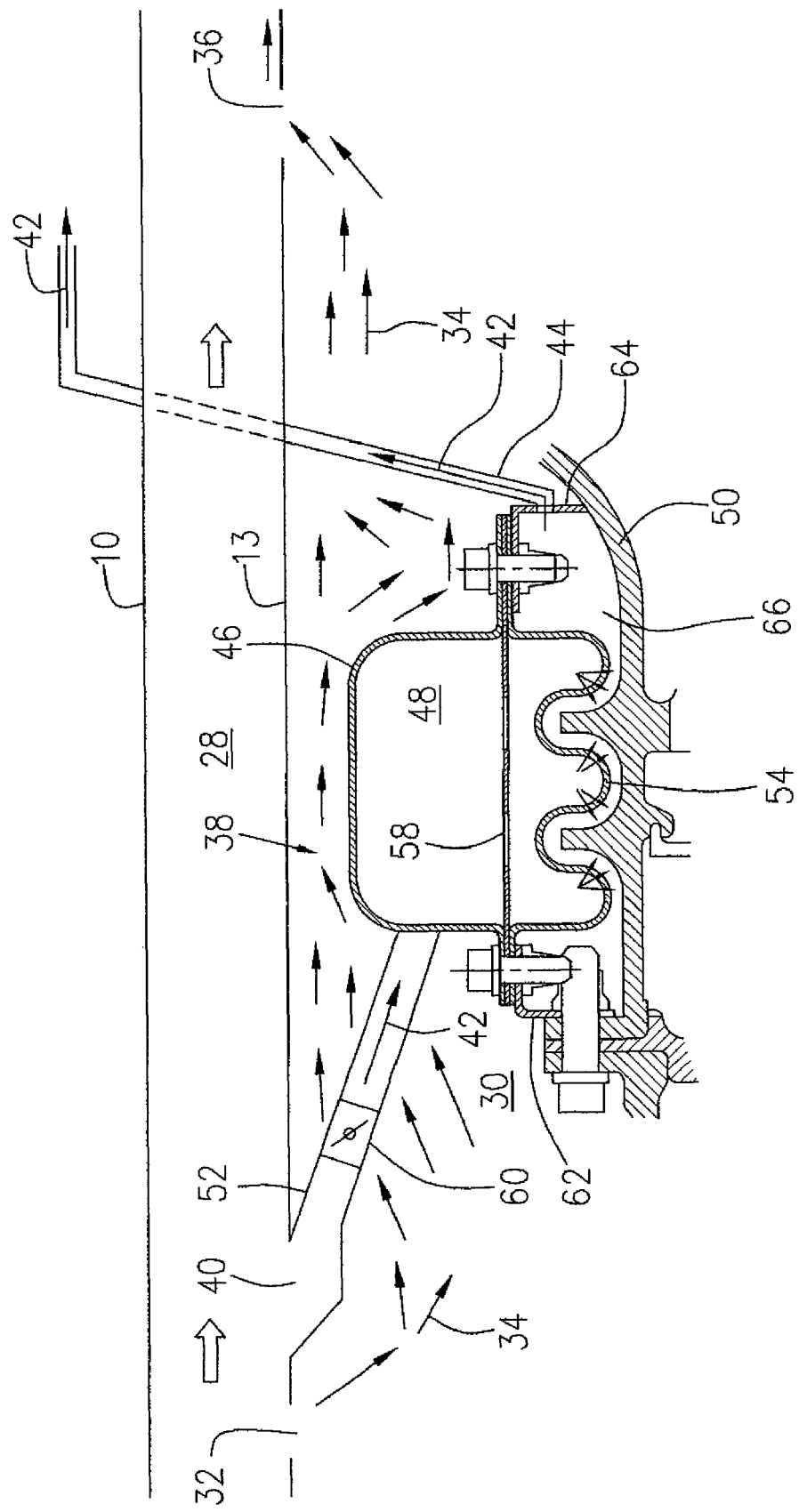
FIG. 2 is a schematic cross-sectional view of the turbofan gas turbine engine of FIG. 1 showing an active tip clearance control (ATCC) apparatus in a pressurized core compartment of a turbofan gas turbine engine, according to one embodiment.

Referring FIGS. 1-3, the turbofan gas turbine engine according to one embodiment includes a core compartment 30 which is configured within the core case 13 and includes an inlet 32 defined in the core case 13, for introducing a first portion 34 of the bypass air flow into the core compartment 30 to cool a number of engine components such as actuators, sensors, etc. (not shown) which are situated inside the core compartment 30. An outlet 36 defined in the core case 13 downstream of the inlet 32 is in fluid communication with the core compartment 30. The core compartment 30 is sealed to substantially maintain the air pressure of the first portion 34 of the bypass air flow in order to have the core compartment 30 pressurized, thereby allowing the first portion 34 of the bypass air flow to be discharged from the core compartment 30 only through the outlet 36 and back into the bypass air duct 28 for thrust recovery.

An active tip clearance control (ATCC) apparatus 38 is located within the sealed core compartment 30 and includes an inlet 40 defined in the core case 13 far introducing a second portion 42 of the bypass air flow into the ATCC apparatus 38. A vent passage 44 is provided to the ATCC apparatus 38 and is in fluid communication with the atmosphere. The ATCC apparatus 38 is sealed to prevent the second portion 42 of the bypass air flow passing through the ATCC apparatus 38, from mixing with the first portion 34 of the bypass air flow passing through the space within the core compartment but outside of the ATCC apparatus 38. Therefore, the second portion 42 of the bypass air flow passes through the ATCC apparatus 38 and is discharged only through the vent passage 44 to outside of the engine. The vent passage 44 may be configured with an outlet (not numbered) to discharge the second portion 42 of the bypass air flow into the atmosphere in a rearward direction of the aircraft turbofan gas turbine engine, as illustrated in FIG. 2, for thrust recovery.

The ATCC apparatus 38 may include an annular manifold 46, which may be similar to that known and disclosed by Pezzetti, Jr. et al. in United States Patent Publication Number US 2007/0086887A1 which is incorporated herein by reference. The manifold 46, according to the embodiment, is positioned around the turbine assembly (either the high pressure turbine assembly 24 or low pressure turbine assembly 18), for example, around an annular turbine case 50 such as a turbine support case or a turbine shroud. The manifold 46 defines an annular plenum 48 therein and is provided with an inlet passage 52 extending from the inlet 40 of the ATCC apparatus 38 to the annular plenum 48. Therefore, the second portion 42 of the bypass air flow is introduced from the annular bypass air duct 28 through the inlet 40 and inlet passage 52 and then into the annular plenum 48. The manifold 46 may further include a shield 54 which is configured to contour an outer surface of the turbine case 50 and includes a plurality of holes 56 defined in the shield 54 (see FIG. 3), to allow the second portion 42 of the bypass air flow to be discharged from the holes 56 and to impinge on the outer surface of the turbine case 50 in order to cool the turbine case and other turbine components which are directly connected to the turbine case 50, thereby reducing blade tip clearances.

It is optional to provide a divider 58 with a plurality of openings (not numbered) within the annular manifold 46 to circumferentially divide the annular plenum 48 in order to improve pressure distribution of the second portion 42 of the bypass air flow within the manifold 46.

A valve 60 may be provided to the inlet passage 52 for controlling the flow rate of the second portion 42 of the bypass air flow passing through the ATCC apparatus 38, thereby controlling clearances between turbine components such as the clearance between a turbine shroud and turbine blade tips, which is affected by the impingement cooling of the turbine case 50.

The ATCC apparatus 38 further includes mounting devices for mounting the manifold 46 on the turbine case 50. For example, a plurality of mounting brackets which mount the manifold 46 on the annular turbine case 50, are connected circumferentially one to another to form respective front and rear annular sealing walls 62, 64 extending radially between the manifold 46 and the turbine case 50 in order to thereby define a sealed annular cavity 66 between the manifold 46 and the annular turbine case 50. The vent passage 44 of the ATCC apparatus 38 is connected, for example, to the rear annular sealing wall 64 and is in fluid communication with the sealed annular cavity 66. Therefore, the air pressure within the cavity 66 is substantially close to ambient pressure.

The sealed annular cavity 66 which is situated within but isolated from the pressurized core compartment 30, provides a significant pressure drop $\Delta P$ to the pressure within the manifold 46, which is substantially close to the pressure of the bypass air flow in the annular bypass air duct 28. This pressure drop or pressure differential $\Delta P$ helps the discharge of the second portion 42 of the bypass air flow from the manifold 46 and impingement of same on the outer surface of the turbine case 50.

It should be noted that due to the pressure differential $\Delta P$ between the plenum 48 and the sealed cavity 66, the inlet 40 of the ATCC apparatus 38 according to this embodiment, does not need a scoop protruding into the main bypass air flow passing through the annular bypass air duct 28 in order to increase the pressure of the second portion 42 of the bypass air flow to be introduced into the ATCC apparatus 38. Therefore, the inlet 40 may be configured simply with an opening defined in the core case 13 and is free of any components substantially radially extending into the annular bypass air duct 28. The inlet 32 of the core compartment 30 may or may not be configured similarly to the inlet 40 as defined simply by an opening in the core case 13.

It should be further noted that the first portion 34 of the bypass air flow is directed to pass through the core compartment 30 in a volume significantly larger than the volume of the second portion 42 of the bypass air flow being directed through the ATCC apparatus 38. Therefore, the second portion 42 of the bypass air flow which is vented to the atmosphere after being used for the ATCC apparatus 38, is a relatively small fraction of the sum of the main bypass air flow passing through the bypass air duct 28 and the first portion 34 of the bypass air flow which is injected back into the bypass air duct 28, resulting in improvements in the bypass duct performance of the turbofan gas turbine engine.

The above description is meant to be exemplary only, and one skilled in the art will recognize that changes may be made to the embodiments described without departing from the scope of the concept disclosed. For example, the ATCC apparatus may configured differently from the described embodiment. The sealed cavity 66 between the manifold 46 and the turbine case 50 may be formed by an independent sealing device instead of being integrated with the mounting brackets. The ATCC system may be used in association with any suitable bladed array within the engine, for example in a turbine or a compressor. Still other modifications which fall within the scope of the concept will be apparent to those skilled in the art, in light of a review of this disclosure, and such modifications are intended to fall within the appended claims.

What is claimed is:

1. An aircraft turbofan gas turbine engine comprising:
   an annular outer case surrounding a fan assembly;
   an annular core case positioned within the outer case and accommodating a compressor assembly, a combustion gas generator assembly and a turbine assembly, the annular outer and core cases defining an annular bypass air duct therebetween for directing a bypass air flow driven by the fan assembly to pass therethrough;
   a core compartment configured within the annular core case, the core compartment having an inlet defined in the annular core case for introducing a first portion of the bypass air flow into the core compartment to cool a number of engine components located within the core compartment and having an outlet defined in the annular core case downstream of the inlet, the core compartment being sealed to allow the first portion of the bypass air flow to be discharged only through the outlet and back to the annular bypass air duct; and
   an active tip clearance control (ATCC) apparatus located within the sealed core compartment, the ATCC apparatus having an inlet defined in the annular core case for introducing a second portion of the bypass air flow into the ATCC apparatus and having a vent passage in fluid communication with atmosphere, the ATCC apparatus being sealed to impede the second portion of the bypass air flow from mixing with the first portion of the bypass air flow.

2. The engine as defined in claim 1 wherein the ATCC apparatus comprises an annular manifold around the turbine assembly for discharging the second portion of the bypass air flow to cool the turbine assembly, thereby reducing clearances between turbine components.

3. The engine as defined in claim 2 wherein the ATCC apparatus comprises a sealed annular cavity defined radially between the annular manifold and a turbine case to be cooled by the second portion of the bypass air flow, the sealed annular cavity being prevented from fluid communication with the core compartment.

4. The engine as defined in claim 3 wherein the annular manifold comprises a plurality of holes defined in the annular manifold to allow the second portion of the bypass air flow to form a plurality of air streams discharged from the annular manifold and impinging on an outer surface of the turbine case.

5. The engine as defined in claim 3 wherein the vent passage is in fluid communication with the sealed annular cavity.

6. The engine as defined in claim 5 wherein the vent passage comprises an outlet discharging the second portion of the bypass air flow into the atmosphere in a rearward direction.

7. The engine as defined in claim 3 wherein the ATCC apparatus comprises mounting devices for mounting the annular manifold on the turbine case, the mounting devices forming respective front and rear annular sealing walls extending radially between the annular manifold and the turbine case to thereby define the sealed annular cavity.

8. The engine as defined in claim 7 wherein the vent passage is connected to the rear annular sealing wall.

9. The engine as defined in claim 2 wherein the ATCC apparatus comprises an inlet passage extending from the inlet of the ATCC apparatus to the annular manifold.

10. The engine as defined in claim 9 wherein the ATCC apparatus comprises a valve connected in the inlet passage for controlling a flow rate of the second portion of the bypass air flow, thereby controlling said clearances between turbine components.

11. The engine as defined in claim 1 wherein the respective inlets of the core compartment and the ATCC apparatus are defined by first and second openings in the annular core case, free of components substantially radially extending into the annular bypass air duct.

12. A method for use of bypass air of a turbofan gas turbine engine to cool the engine while reducing bypass air thrust losses, the method comprising steps of:
   a) directing a first portion of bypass air from a bypass air duct of the engine into a core compartment of a core case of the engine to cool a number of engine components within the core compartment in a manner to substantially maintain an air pressure of the first portion of bypass air and then injecting the first portion of bypass air back into a main bypass air flow passing through the bypass air duct;
   b) directing a second portion of bypass air from the bypass air duct to pass through an active tip clearance control (ATCC) apparatus within the core compartment to cool an annular turbine case and then venting the second portion of bypass air to atmosphere; and
   c) isolating the second portion of bypass air from the first portion of bypass air to prevent mixing one with another.

13. The method as defined in claim 12 wherein step (b) comprises a further step of causing the second portion of bypass air to form a plurality of air streams discharging from a plenum and impinging on an outer surface of an annular turbine case.

14. The method as defined in claim 13 wherein the impinging action is performed in a sealed cavity isolated from the core compartment, the sealed cavity being in fluid communication with the atmosphere to create a pressure drop in the sealed cavity with respect to a pressure in the plenum, thereby resulting in said impinging action.

15. The method as defined in claim 14 wherein the sealed cavity is defined radially between the plenum and the turbine case.

16. The method as defined in claim 12 wherein the first portion of bypass air is directed in a volume greater than a volume in which the second portion of bypass air is directed.

17. The method as defined in claim 16 further comprising a step of adjusting a flow rate of the second portion of bypass air to thereby control the cooling action of the turbine case, resulting in an active tip clearance control.

* * * * *